United States Patent
Mohanaveeramani et al.

(10) Patent No.: US 12,316,239 B2
(45) Date of Patent: May 27, 2025

(54) CELL COMPRISING A POWER LINK WITH A VARIABLE INDUCTANCE

(71) Applicant: Hitachi Energy Ltd, Zürich (CH)

(72) Inventors: Aravind Mohanaveeramani, VästerÅs (SE); Georgios Stamatiou, VästerÅs (SE); Panagiotis Kakosimos, VästerÅs (SE)

(73) Assignee: Hitachi Energy Ltd, Zürich (CH)

( * ) Notice: Subject to any disclaimer, the term of this patent is extended or adjusted under 35 U.S.C. 154(b) by 178 days.

(21) Appl. No.: 18/009,869

(22) PCT Filed: Jun. 12, 2020

(86) PCT No.: PCT/EP2020/066367
§ 371 (c)(1),
(2) Date: Dec. 12, 2022

(87) PCT Pub. No.: WO2021/249656
PCT Pub. Date: Dec. 16, 2021

(65) Prior Publication Data
US 2023/0246562 A1     Aug. 3, 2023

(51) Int. Cl.
*H02M 7/00*     (2006.01)
*H02M 7/5387*   (2007.01)

(52) U.S. Cl.
CPC ......... *H02M 7/003* (2013.01); *H02M 7/5387* (2013.01)

(58) Field of Classification Search
CPC .. H02M 7/003; H02M 7/5387; H02M 7/4835; H02M 1/32
See application file for complete search history.

(56) References Cited

U.S. PATENT DOCUMENTS

| | | | |
|---|---|---|---|
| 2003/0107875 A1* | 6/2003 | Bijlenga | H01L 24/72 257/E25.026 |
| 2008/0207027 A1 | 8/2008 | Dorn | |
| 2015/0345989 A1* | 12/2015 | Hubert | G01P 3/489 324/609 |
| 2016/0226480 A1 | 8/2016 | Marquardt | |

(Continued)

FOREIGN PATENT DOCUMENTS

| | | |
|---|---|---|
| CA | 2836030 A1 | 6/2014 |
| CN | 107104603 A | 8/2017 |

(Continued)

OTHER PUBLICATIONS

Zhou, H., et al., "Inductive Fault Current Limiters in VSC-HVDC Systems: A Review," IEEE Access, vol. 8, Mar. 3, 2020, 13 pages.

(Continued)

*Primary Examiner* — Kyle J Moody
(74) *Attorney, Agent, or Firm* — Slater Matsil, LLP

(57) ABSTRACT

A cell (12) comprises a first cell connection terminal (CC1), a second cell connection terminal (CC2), a first series connection of two switches (T1, T2), an energy storage branch (ESB) comprising a capacitor ($C_C$) and a first power link interconnecting the first series connection of two switches (T1, T2) with the energy storage branch (ESB), where the first power link has an inductance (LBB1) that changes based on the current through it. There is also a converter comprising such a cell.

20 Claims, 6 Drawing Sheets

(56) References Cited

U.S. PATENT DOCUMENTS

| | | |
|---|---|---|
| 2016/0379790 A1 | 12/2016 | Boehme |
| 2017/0214335 A1 | 7/2017 | Basic et al. |
| 2019/0207382 A1 | 7/2019 | Papini et al. |
| 2023/0246562 A1* | 8/2023 | Mohanaveeramani ............... H02M 7/5387 363/132 |

FOREIGN PATENT DOCUMENTS

| | | |
|---|---|---|
| CN | 110880860 A | 3/2020 |
| DE | 102014200108 A1 | 7/2015 |
| WO | 2015036149 A1 | 3/2015 |
| WO | 2015090367 A1 | 6/2015 |
| WO | 2018149493 A1 | 8/2018 |
| WO | 2019145044 A1 | 8/2019 |

OTHER PUBLICATIONS

Zhou, H., et al., "Performance Investigation on a Novel High Inductance Changing Ratio MMC-Based Direct Current System Saturated Core FCL," IEEE Transactions on Power Delivery, vol. 35, No. 3, Jun. 2020, 13 pages.

* cited by examiner

CELL COMPRISING A POWER LINK WITH A VARIABLE INDUCTANCE

TECHNICAL FIELD

The present application relates to a cell comprising a power link with a variable inductor.

BACKGROUND

Voltage source converters (VSCs), such as modular multilevel converters (MMCs), comprise switches. These switches may be arranged in so called half bridge or full bridge cells, where a cell may comprise a series-connection of two switches connected to a capacitor via DC buses. As switches, semiconductors are used, in particular transistors like IGBT (Insulated Gate Bipolar Transistor). MMCs have become a popular choice for the grid connected converters due to its enhanced modularity, scalability, and excellent harmonic performance with reduced losses.

Faulty semiconductor modules (e.g., IGBT modules) in an MMC cell may pose a high risk of massive damage. In many cases, if one TGBT in a half-bridge or full-bridge circuit, the adjacent IGBT may be able to clear a resulting fault current from DC bus capacitor(s). However, there are cases where it may not be possible to prevent this fault current.

As a stray inductance between IGBT and a DC bus may be purposely very low (in order to achieve acceptable converter performance/low transient overvoltage at the IGBT collector-emitter terminals/low IGBT switching losses) and the stored energy in the cell DC capacitor may be high, the prospective fault current may be high, such as in the range of a few hundreds kA.

For MMCs, a large cell capacitor is often required to buffer ripple energy resulting from the real/reactive power transfer during short-circuit failure of a semiconductor, the cell capacitor energy may be discharged via the semiconductor leading to explosion/significant destruction of the cell.

Without any countermeasure, bond wires (the wires which connect the semiconductor chip to metal contacts) within an IGBT module will immediately fail, resulting in an electric arc. This arc will be fed by the high energy stored in the DC capacitor. This results in an explosion of the IGBT module with the consequence of a massive destruction. The difficulties to handle this problem increases with increasing energy stored in the DC capacitor.

There are some possibilities to overcome this issue, such as utilization of presspack semiconductors or utilization of explosion boxes protecting the environment from the detrimental effect of the explosion. These are either suited only for high power level or add substantial costs without adding functional improvement for regular operation.

Another solution is to use a so-called DC crowbar to discharge most of the cell capacitor energy into a thyristor in order to limit the energy discharge into the semiconductor switches. However also in this case the fault current can become too large for the crowbar to handle.

There is in view of what has been mentioned above a need for improving the way that a short circuit current is handled in a cell. An improved solution is therefore desirable.

SUMMARY

Embodiments of the present application relate to the field of power converters, for example, voltage source converters (VSCs). Particular embodiments relate to a cell that can be used in a Modular Multilevel Converter (MMC).

In a first aspect the present invention may disclose a cell for a voltage source converter, where the cell comprises a first cell connection terminal, a second cell connection terminal, a first series connection of two switches, an energy storage branch comprising a capacitor and a first power link interconnecting the first series connection of two switches with the energy storage branch, where the first power link has an inductance that changes based on the current through it The inductance may have a static component and a transient component and the first power link may have the inductance of the static component during steady state operation of the cell and may be configured to introduce the transient component triggered by a short-circuit current through the link. After the introduction of the transient component the first power link may thereby have an inductance that is a sum of the static and transient components.

The first power link may additionally comprise a first busbar interconnecting a first end of the first series-connection of two switches with a first end of the energy storage branch and a second busbar interconnecting a second end of the first series connection of two switches with a second end of the energy storage branch.

In order to provide the static component of the first power link, the first busbar may be located adjacent the second busbar. At least a part of the first busbar may be moveable from the second busbar by repulsion forces caused by the short-circuit current thereby introducing the transient component of the power link.

The busbars may run adjacent each other in parallel along a current transporting direction of the first busbar during steady state operation. The busbars may additionally be separated by an insulator—

The first busbar may comprise a moveable section having a first end joined to a first stationary section via a first joint structure, where the first stationary section is fixedly attached to the second busbar and the first joint structure is deformable by the repulsion forces for moving the moveable section away from the second busbar thereby introducing a gap between the first and second busbars causing the transient component of the power link inductance to be introduced.

In steady state operation the first stationary section may be placed adjacent and aligned with the moveable section in the current transporting direction of the first busbar and the first joint structure may comprise at least one fold of superfluous material interconnecting the first stationary section with the moveable section and configured to be unfolded by the repulsion forces caused by the short-circuit current. The number of folds used may correspond to the distance the moveable section is desired to be moved.

At least one fold and with advantage all folds may additionally comprises a loop of superfluous material. The loop may have a radius that is at least one and a half times higher than the thickness of the first busbar.

The first busbar may additionally comprise a second stationary section joined to a second end of the moveable section via a second joint structure, where the second stationary section is fixedly attached to the second busbar and the second joint structure is deformable by the repulsion forces caused by the short-circuit current for moving the moveable section away from the second busbar.

In steady state operation the second stationary section may be placed adjacent and aligned with the moveable section in the current transporting direction of the first busbar and the second joint structure may comprise at least one fold of superfluous material interconnecting the second stationary section with the moveable section and configured to be unfolded by the repulsion forces caused by the short-circuit current. The number of folds used may here correspond to the distance the moveable section is desired to be moved. The number may with advantage be the same as in the first joint structure. At least one fold and with advantage all folds may also comprises a loop of superfluous material At least a part of the second busbar may also be moveable away from the first busbar by the repulsion forces caused by the short-circuit current The second busbar may for this reason comprise stationary and moveable sections joined to each other in the same way as corresponding stationary and moveable sections of the first busbar. The stationary and moveable sections of both busbars must therefore be aligned with each other along the current transporting direction of the first busbar.

The cell may additionally comprise a bypass switch connected between the cell connection terminals, which bypass switch may be mechanical or electronic.

The cell may be half-bridge cell and therefore the midpoint of the first series connection of two switches may form the first cell connection terminal and either a first end of the first series connection of two switches or a second end of the first series connection of switches may form the second cell connection terminal.

Alternatively, the cell may be a full-bridge cell. The cell may for this reason further comprise a second series connection of two switches and a second power supply link interconnecting the first series connection of two switches with the energy storage branch. In this case the midpoint of the first series connection of two switches may form the first cell connection terminal and the midpoint of the second series connection of two switches may form the second cell connection terminal.

It is additionally possible that the second power link has an inductance that changes based on the current through it. In order to provide an inductance that changes based on the current through the second power link, the second power link may be realized in the same way as the first power link The cell may further comprise a crowbar branch connected in parallel with the energy storage branch, which crowbar branch may comprising a first switching element adapted to be activated to short-circuit the capacitor of the energy storage branch and dissipate energy stored therein based on the detection of a short-circuit fault. The crowbar branch may additionally comprise a first impedance, such as a first inductance.

The crowbar branch may further comprise a second switching element and a midpoint connected to the midpoint of the first series connections of two switches. In this case one switching element is placed on one side of the midpoint and the other switching element is be placed on the other side of the midpoint. In this case it is also possible with a first and a second impedance, where in a similar way one impedance is placed on one side of the midpoint and the other impedance is placed on the other side of the midpoint.

It is additionally possible that also the energy storage branch comprises an inductor connected in series with the capacitor.

Further aspects are directed towards a modular multilevel converter comprising cells, where at least one cell is such an assembly being a cell.

BRIEF DESCRIPTION OF THE DRAWINGS

Embodiments of the present disclosure will be presented in the sense of examples and their advantages are explained in greater detail below, with reference to the accompanying drawings, wherein.

DETAILED DESCRIPTION OF EMBODIMENTS

Figure 1:
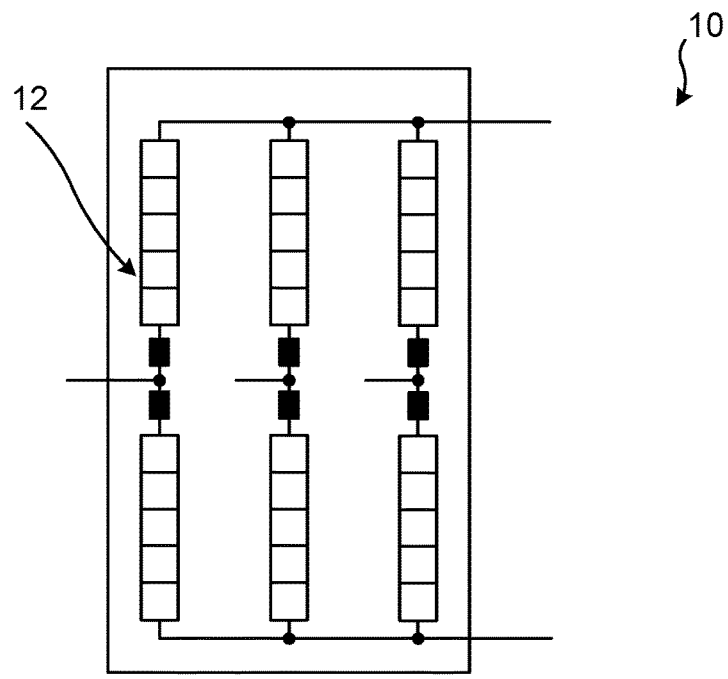
FIG. 1 shows a first variation of a modular multilevel converter comprising cells.

Hereinafter, the principle and spirit of the present disclosure will be described with reference to the illustrative embodiments. It should be understood that all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems, and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present subject matter provides a solution which intends to limit the peak short-circuit current of a cell, which can be used to prevent explosions and/or simplify the circuitry used for preventing or handling explosions in a cell.

FIG. 1 shows a converter 10 comprising cells where the above-mentioned peak short-circuit current limitation may be implemented.

The converter 10 is a voltage source converter (VSC) and may be realized as a modular multilevel converter (MMC). In the example shown in FIG. 1, the converter 10 is an MMC. The MMC is in this case made up of a number of parallel phase legs, here three, where each phase leg comprises a number of cascaded cells 12. The midpoint of a phase leg may then form an AC output of the converter 10. As there are three phase legs, the converter may be connected to a three-phase AC system. A cell 12 may in turn be a full-bridge cell or a half-bridge cell. A cell therefore comprises energy storage elements and switches configured to insert the energy storage elements with one out of a maximum of two different polarities in a phase leg or to bypass the energy storage element. The energy storage elements may with advantage be capacitors. Thereby each cell also has a cell voltage. This cell voltage is thus inserted into the phase leg or bypassed in order to form a waveshape.

The shown converter 10 is merely an example of an MMC where cells may be used. It is also possible that the phase legs are wye or delta-connected, where the junction between two phase legs is connected to a corresponding phase of a three-phase AC system.

In one variation of the converter 10, each phase leg is made up full-bridge cells. In another variation each phase leg is made up of half-bridge cells. In other variations each phase leg may be made up of a mixture of full-bridge and half-bridge cells.

Aspects of the invention are directed towards providing a power link in a cell that limits the short-circuit current in case of a fault in the cell.

Figure 2:
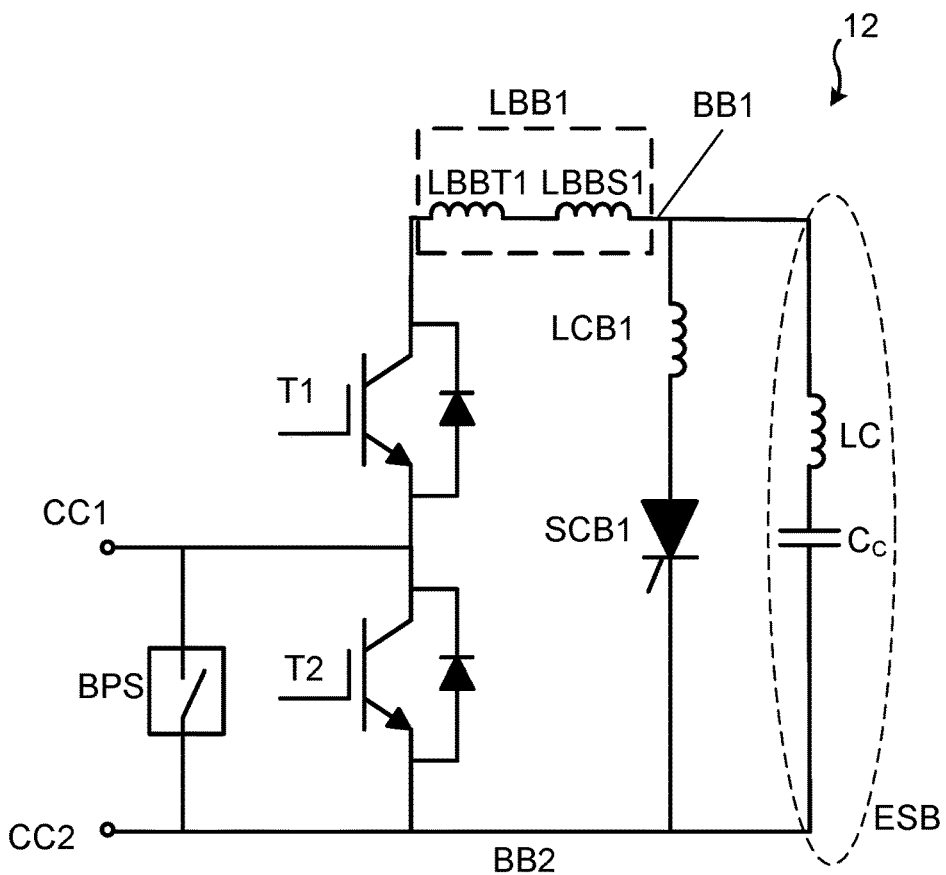
FIG. 2 shows a first variation of a cell with a half-bridge realization.

FIG. 2 schematically shows a cell 12 with a half-bridge realization. The cell may be used as a half-bridge cell of an MMC.

The cell 12 comprises an energy storage branch ESB comprising a capacitor Cc and having a first end and a second end. The cell 12 also comprises a first series-connection (series circuit) of two switches T1 and T2, where the first series connection of two switches is connected in parallel with the energy storage branch ESB. In the present example the energy storage branch ESB furthermore comprises an optional inductor LC connected in series with the capacitor Cc.

A first end of the first series circuit (series connection) of the two switches T1 and T2 is connected to the first end of the energy storage branch ESB via a first busbar BB1 and a second end of the first series circuit of switches T1 T2 is connected to the second end of the energy storage branch ESB via a second busbar BB2, where the two busbars together form a power link for transferring power to or from the energy storage branch ESB. Thereby the first power link comprises a first busbar BB1 interconnecting a first end of the first series-connection of two switches T1 and T2 with a first end of the energy storage branch ESB and a second busbar BB2 interconnecting a second end of the first series connection of two switches T1 and T2 with a second end of the energy storage branch ESB.

A series-connection of two switches T1 and T2 may be provided, perhaps together with the energy storage branch ESB, in a semiconductor package or a module, such as a half-bridge module, for instance in the form of a press pack or bond-wire based module like a so-called LinPak or Hipak module. In this case terminals of the series-circuit of two switches that are used for connection to the energy storage branch may be provided inside the semiconductor package or module.

The cell in FIG. 2 is realized as a half bridge, comprising two switches T1 and T2 in a series connection. Generally, the switches may comprise a semiconductor like a transistor and a diode. The switches used in the series-circuits may thus comprise semiconductors. The semiconductors may be, for example, Silicone Carbide Metal Oxide Semiconductor Field Effect Transistors (SiC MOSFETs), Insulated Gate Bipolar Transistors (IGBTs) or Bi-Mode Insulated Gate Transistor (BIGT). The kind of semiconductor is not limiting and future semiconductors, suitable to cover the needs of a power converter or cell according to the present application, may be also included.

The diode is switched antiparallel to the conducting direction of the transistor. The diode may be an integral part of the transistor (power transistor).

A transistor only allows for a current flow in one direction, in this case from collector to emitter. The diode as a semiconductor allows for a current flow in a direction opposite to the direction which the transistors T1 and T2 allow. Preferably the diode ("free-wheel diode") is adapted to bear the same power (or current) as the transistor.

The midpoint between the switches of the first series circuit of two switches T1 and T2 forms a first cell connection terminal CC1. In the half-bridge cell structure in FIG. 2, the second end of the first series-circuit of two switches T1 and T2 forms a second cell connection terminal CC2. As an alternative, the first end of the first series-circuit of two switches T1 and T2 may instead form the second cell connection terminal CC2.

The cell comprises an optional crowbar branch connected in parallel with the energy storage branch ESB. As can be seen in FIG. 2, the crowbar branch furthermore comprises a first switching element SCB1 acting as a DC crowbar connected in series with an optional inductor LCB1. The inductor is an example of one type of impedance that may be used in the crowbar branch. Other types that may be used are capacitor and resistance or a combination of any of inductor, capacitor, and resistance in order to achieve a specific objective. The crowbar SCB1 is adapted to be externally actuated to short-circuit the energy storage branch ESB and then especially to short-circuit the capacitor Cc and dissipate energy stored therein. The switching element forming the crowbar may be a semiconductor, preferably a thyristor, which can be activated by a switching signal thereby short-circuiting the capacitor Cc.

As can be seen in FIG. 2, the cell 14 also includes a bypass-switch BPS. The bypass switch BPS is connected between the two cell connection terminals CC1 and CC2. The bypass switch BPS may be realized as a mechanical switch. However, it too may be realized as an electronic switch, such as a thyristor. The bypass switch BPS may be controlled to bypass the whole cell after a crowbar has been used to discharge the capacitor. Through the addition of the bypass switch BPS, the converter in which the cell is provided may be possible to be continued to be used.

The power link has a first inductance LBB1 that changes based on the current through it. The first inductance of the power link may more particularly comprise a first steady state or static component LBBS1 and a first transient component LBBT1, where the power link has the inductance of the static component LBBS1 during steady state operation of the cell and is configured to insert or introduce the transient component LBBT1 in case of or triggered by a short-circuit current running through the power link During a short-circuit, the first power link thus has a first inductance that is a sum of the first static component LBBS1 and the first transient component LBBT1.

During a cell short-circuit fault, the expression for the peak current through the power link may be given by $$i(t) = \frac{U_{c0}}{\omega_0 L_\sigma} e^{-\frac{R_\sigma}{2L_\sigma}t} \sin(\omega_0 t)$$

$$f_0 = \frac{1}{2\pi}\sqrt{\frac{1}{L_\sigma C} - \left(\frac{R_\sigma}{2L_\sigma}\right)^2}$$

$$I_{peak} \cong \frac{U_{c0}}{\omega_0 L_\sigma} e^{-\frac{R_\sigma \pi}{4L_\sigma \omega_0}}$$

Neglecting the resistances in the commutation loop, the expression can be simplified as:

$$I_{peak} \alpha U_{c0} \sqrt{\frac{C}{L_\sigma}}$$

where C is the cell capacitance, Lσ is the inductance in the commutation loop and Uco is the cell capacitor voltage The peak short-circuit current is inversely proportional to the square root of the loop inductance. Hence the adding of an inductance during short-circuit path helps reducing the peak current (and mechanical forces $F \alpha I_{peak}^2$). However, during normal switching operation increasing the loop inductance will result in increased switching loss and higher overvoltage. This will in turn lead to the reduction of the cell nominal voltage. Hence it is proposed that the power link has a steady state or minimum inductance during normal steady state operation and that a transient inductance is added or inserted during cell short circuit faults, where the added or transient inductance may be large, such as up to 10 times the nominal value of the cell inductance.

Figure 3:
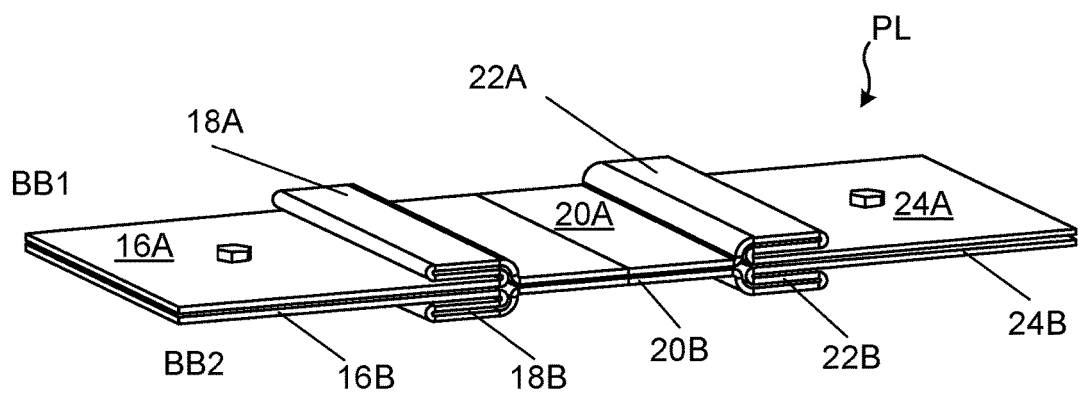
FIG. 3 shows a perspective view of a first realization of a first power link in the cell during steady state operation of the cell.
Figure 4:
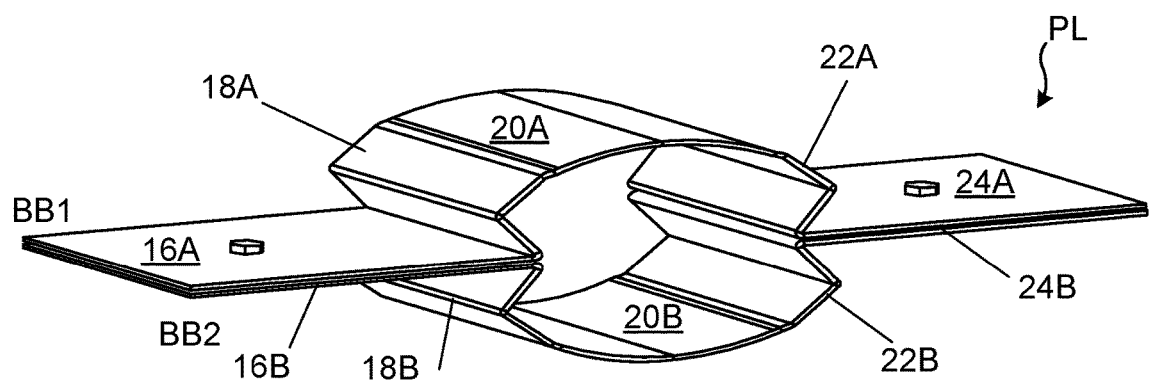
FIG. 4 shows a perspective view of the first realization of the first power link when there is a short-circuit current running through the first power link.
Figure 5:
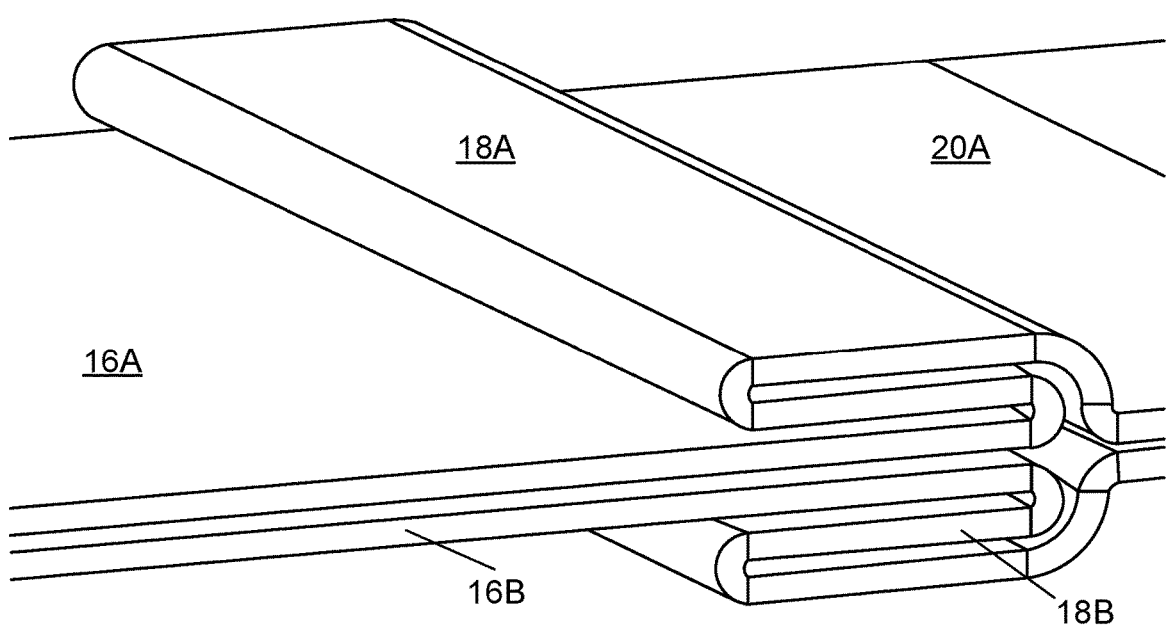
FIG. 5 shows two first joint structures of the power link in FIGS. 3 and 4.

How this can be achieved will in the following be described with reference to a first realization of the power link PL shown in FIGS. 3, 4 and 5, where FIG. 3 shows a perspective view of the first power link PL during steady state operation, FIG. 4 shows a perspective view of the first power link PL when there is a short-circuit current running through it, and FIG. 5 schematically shows two first joint structures of the power link in steady state operation.

The power link PL is made up of the first and the second busbars BB1 and BB2, where the first busbar BB1 is located adjacent the second busbar BB2 and at least a part of the first busbar BB1 is moveable from the second busbar BB2 by repulsion forces caused by the short-circuit current thereby introducing the transient component of the power link. In order to obtain this effect the first busbar BB1 comprises a moveable section 20A having a first end joined to a first stationary section 16A via a first joint structure 18A, where the first stationary section 18A is fixedly attached to the second busbar BB2 and the first joint structure 18A is configured to be deformed by the magnetic repulsion forces for moving the moveable section 20A away from the second busbar BB2. Thereby a gap is introduced between the first and second busbars BB1 and BB2 causing the transient component LBBT of the power link inductance to be introduced. It can be seen in the power link realization shown in FIGS. 3-5, that in steady state operation the first stationary section 16A is placed adjacent and aligned with the moveable section 20A in a longitudinal current transporting direction of the first busbar BB1 during steady state operation and the first joint structure 18A comprises at least one fold of superfluous material interconnecting the first stationary section 16A with the moveable section 20A, where the at least one fold is configured to be unfolded or moved away from the second busbar BB2 by the repulsion forces caused by the short-circuit current. It can also be seen that the first busbar BB1 comprises a second stationary section 24A joined to a second end of the moveable section 20A via a second joint structure 22A, where the second stationary section 24A is fixedly attached to the second busbar BB2 and the second joint structure 22A is deformable by the repulsion forces caused but the short-circuit current for moving the moveable section 20A away from the second busbar BB2. In this case the second joint structure 22A also has the same realization as the first joint structure.

In the version of the power link shown in FIGS. 3-5, also the second busbar BB2 has the same realization as the first busbar BB1. At least a part of the second busbar BB2 is therefore moveable away from the first busbar BB1 by the repulsion forces caused by the short-circuit current and comprises stationary and moveable sections 16B, 20B, 24B joined to each other via joint structures 18B and 22B in the same way as corresponding stationary and moveable sections 16A, 20A, 24A of the first busbar BB1, where the stationary and moveable sections 16A, 16B, 20A, 20B, 24A, 24B of both busbars BB1 and BB2 are aligned with each other along the longitudinal current transporting direction of the first busbar BB1, where the longitudinal current transporting direction of the first busbar BB1 during steady state operation is the opposite of a longitudinal current transporting direction of the second busbar during steady state operation.

It can thus be seen that the second busbar BB2 comprises a moveable section 20B having a first end joined to a first stationary section 16B via a first joint structure 18B, where the first stationary section 16B is fixedly attached to the first busbar BB1, and in this case to the first stationary section 16A of the first busbar BB1. The first joint structure 18B is dimensioned to be deformed by the magnetic repulsion forces caused by the short-circuit current for moving the moveable section 20B away from the first busbar BB1 thereby assisting in the introducing of the gap between the first and second busbars BB1 and BB2 causing the transient component LBBT of the power link inductance to be introduced. It can be seen in the version shown in FIGS. 3-5, in steady state operation the first stationary section 16B is placed adjacent and aligned with the moveable section 20B in the longitudinal current transporting direction of the second busbar BB2 and the first joint structure 18B comprises at least one fold of superfluous material (a looping joint structure) interconnecting the first stationary section 16B with the moveable section 20B and configured to be deformed or unfolded by the repulsion forces caused by the short-circuit current thereby moving the moveable section 20B away from the first busbar BB1. It can also be seen that the second busbar BB2 comprises a second stationary section 24B joined to a second end of the moveable section 20B via a second joint structure 22B, where the second stationary section 24B is fixedly attached to the first busbar BB1, and in this case to the second stationary section 24A of the first busbar BB1. The second joint structure 22B is deformed or unfolded by the repulsion forces caused by the short-circuit current for moving the moveable section 20B away from the first busbar BB1. Through this realization the two first stationary sections 16A, 16B, the two first joint structures 18A and 18B, the two moveable sections 20A and 20B, the two second joint structures 22A and 22B and the two second stationary sections 24A and 24B are aligned with each other along both the current transportation directions.

The first and second busbar BB1 and BB2, which may be considered to be positive and negative busbars, are separated by a thin insulator sheet to minimize the inductance during normal operation. During cell short-circuit faults, very large currents i.e., in excess of 100 kA may flow via the power link PL. Each joint structure 18A, 18B, 22A, and 22B in this case comprises at least one fold of superfluous material and in this case is realized as a number folds of superfluous conductor stacked in a direction that is perpendicular to the current flow directions. The number of folds used may correspond to the distance the moveable section is desired to be moved. The number of folds used in a joint structure may thereby correspond to the distance that the end of the moveable section with which it is joined is desired to be moved. The magnetic forces developed in the power link repels the positive and negative busbar outwards, unfolding the folds of the first and second joint structures 18A, 18B, 22A and 22B in both the first and second busbar BB1 and BB2 thereby moving the moveable sections 20A and 20B and in this case forming an elliptical structure. A large airgap is thereby created, increasing the busbar inductance significantly.

Through this type of operation the peak switch current may be significantly reduced and thereby it is possible that the cell does not explode. It is thereby possible to realize the cells with simplified or even without Presspack modules and explosion boxes. It also opens up the possibility of using DC crowbar protection for SiC based Power Electronic Building Blocks (PEBBs).

The DC crowbar is used to short-circuit the corresponding capacitor within a few microseconds in order to bypass any fault current on the DC bus away from the semiconductor (e.g., IGBT) module(s) through the crowbar component. Through the introduction of the transient inductance component of the power link, it is possible to ensure that the short-circuit current is reduced to a level that the crowbar is able to handle.

Figure 6:
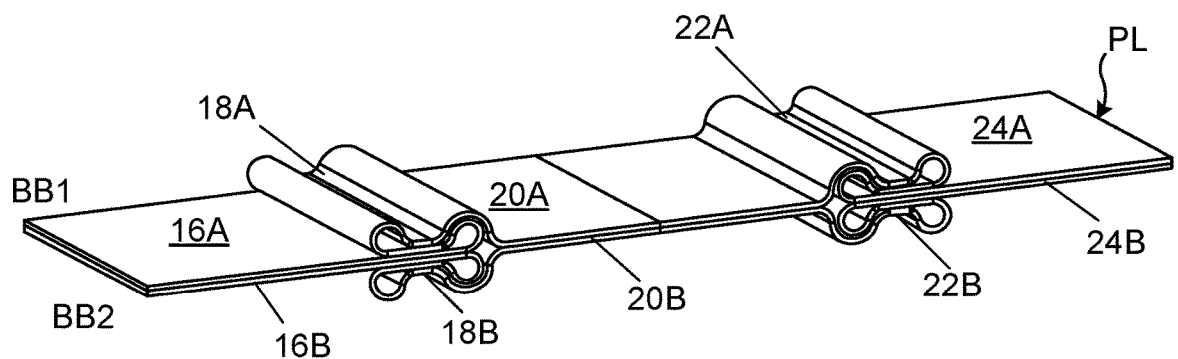
FIG. 6 shows a perspective view of a second realization of the first power link during steady state operation of the cell.
Figure 7:
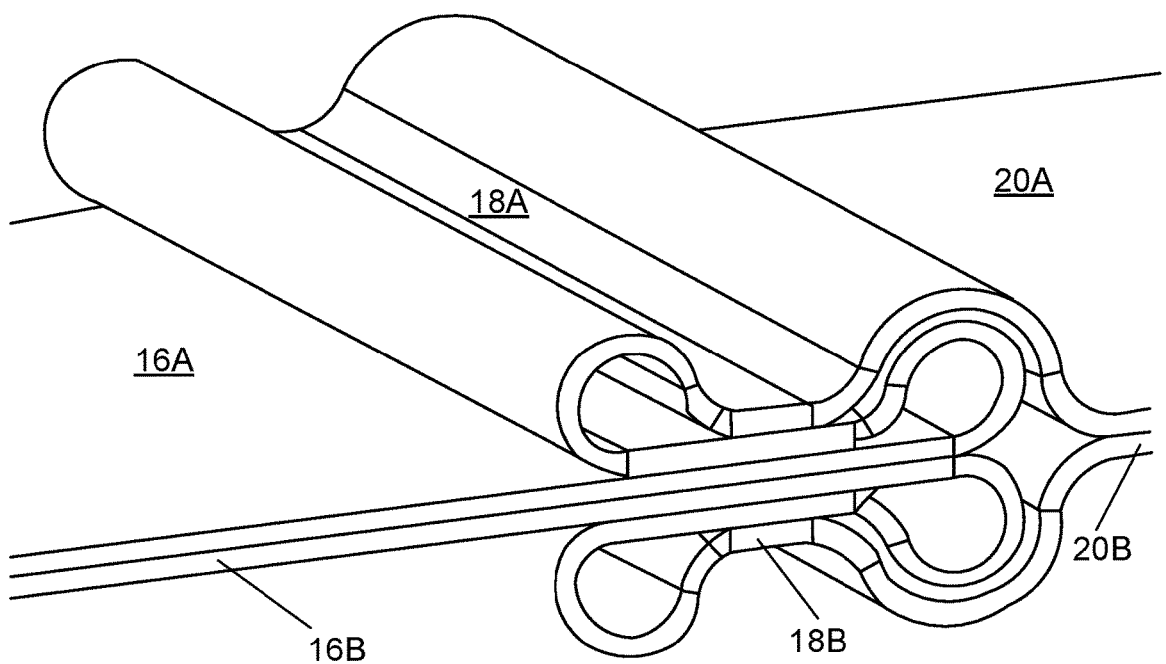
FIG. 7 show a perspective view of two first joint structures of the power link in FIG. 6.
Figure 8:
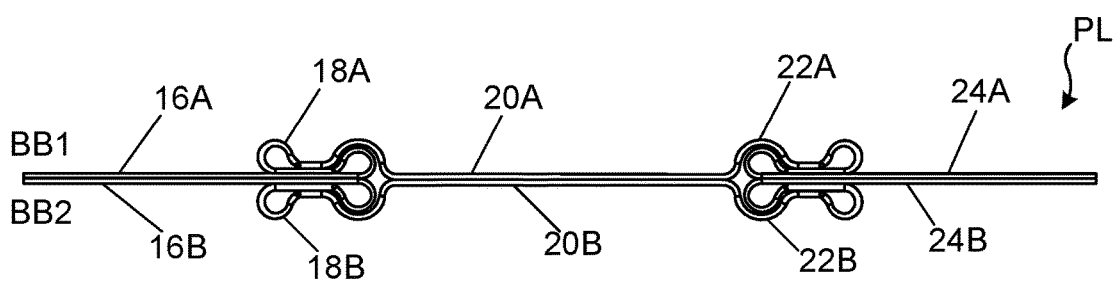
FIG. 8 shows a side view of the second realization of the first power link during steady state operation of the cell.
Figure 9:
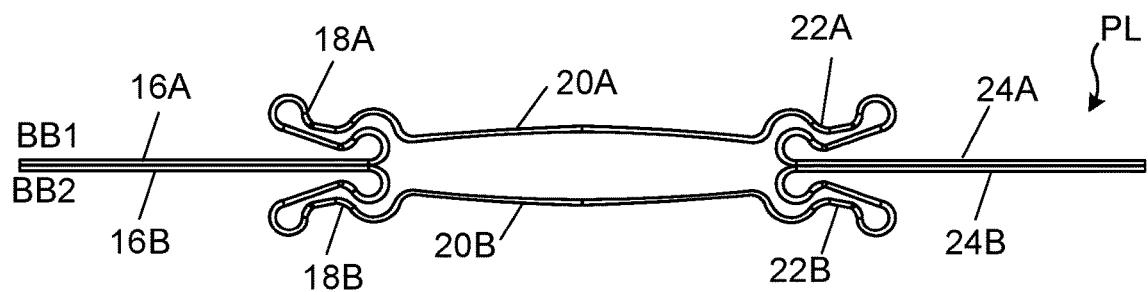
FIG. 9 shows a side view of the second realization of the first power link during an initial stage of the short-circuit current running through the first power link.
Figure 10:
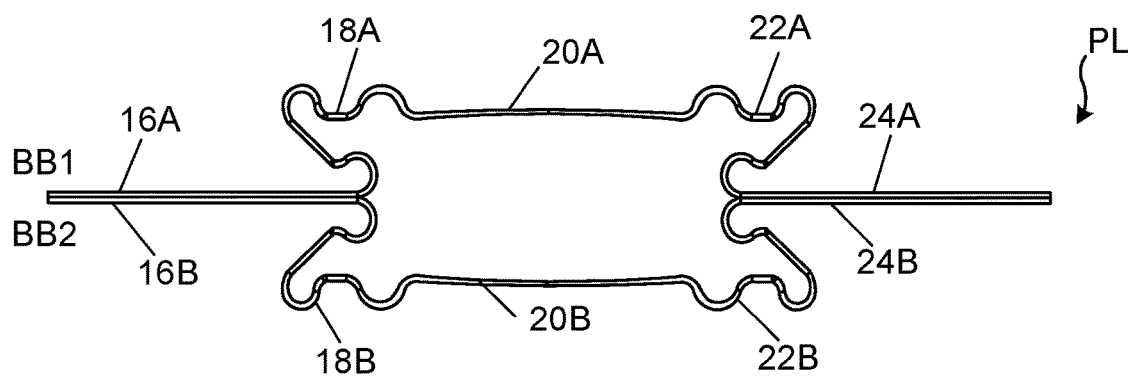
FIG. 10 shows a side view of the second realization of the first power link during a intermediate stage of the short-circuit current running through the first power link.
Figure 11:
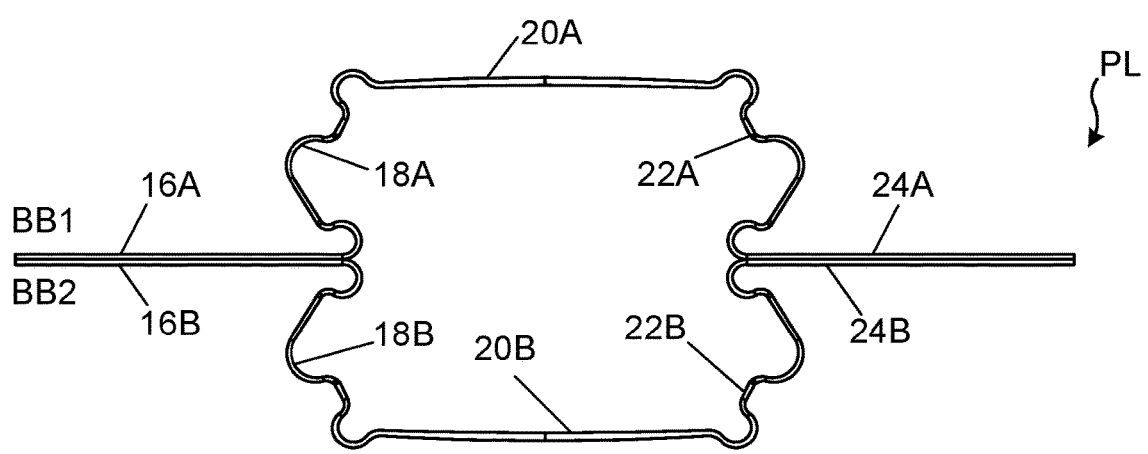
FIG. 11 shows a side view of a final stage of the short-circuit current running through the first power link.

A design forming a second realization of the first power link PL is schematically shown in FIGS. 6, 7, 8, 9 10 and 11, where FIG. 6 shows a perspective view of the first power link PL during steady state operation of the cell, FIG. 7 shows two first joint structures of the power link, FIG. 8 shows a side view of the first power link PL during steady state operation of the cell, FIG. 9 shows a side view of the first power link PL during an initial stage of the short-circuit current, FIG. 10 shows a side view of the first power link PL during an intermediate stage of the short-circuit current, and FIG. 11 shows a side view of a final stage of the short-circuit current running.

The busbar plates forming the first and second busbar BB1 and BB2 may as an example be made of aluminum with a thickness of 2 mm each, length of 389 mm from edge-to-edge and width of 100 mm. It can be seen that in this second realization of the power link, each fold comprises a loop so that each joint structure 18A, 18B, 22A and 22B comprises two folds, each provided with a loop. Rule-of-thumb is that the loops in the folds of sheet metal should not have a radius smaller than 1.5 times the thickness of the respective sheet, otherwise cracks may develop in the metal along the folded areas. For the design presented, 4 mm radius (i.e., 2 times) is considered for loops in the folds of the joint structure The folds are then being unfolded by the magnetic repulsion forces for forming a large volume with the movable sections 20A and 20B. As an example the inductance can in this case be increased by a factor of 20 to 25 when the busbar unfolds completely. It is assumed that the forces needed to unfold the busbar (2 mm thickness) completely can be achieved at 50 kA to 70 kA. Reducing the thickness of the busbar could help achieve the unfolding at lower peak current. However, at this thickness there is a risk of busbar open-circuit using very thin busbars.

It is possible to use the above-described power link also in other types of cells.

Figure 12:
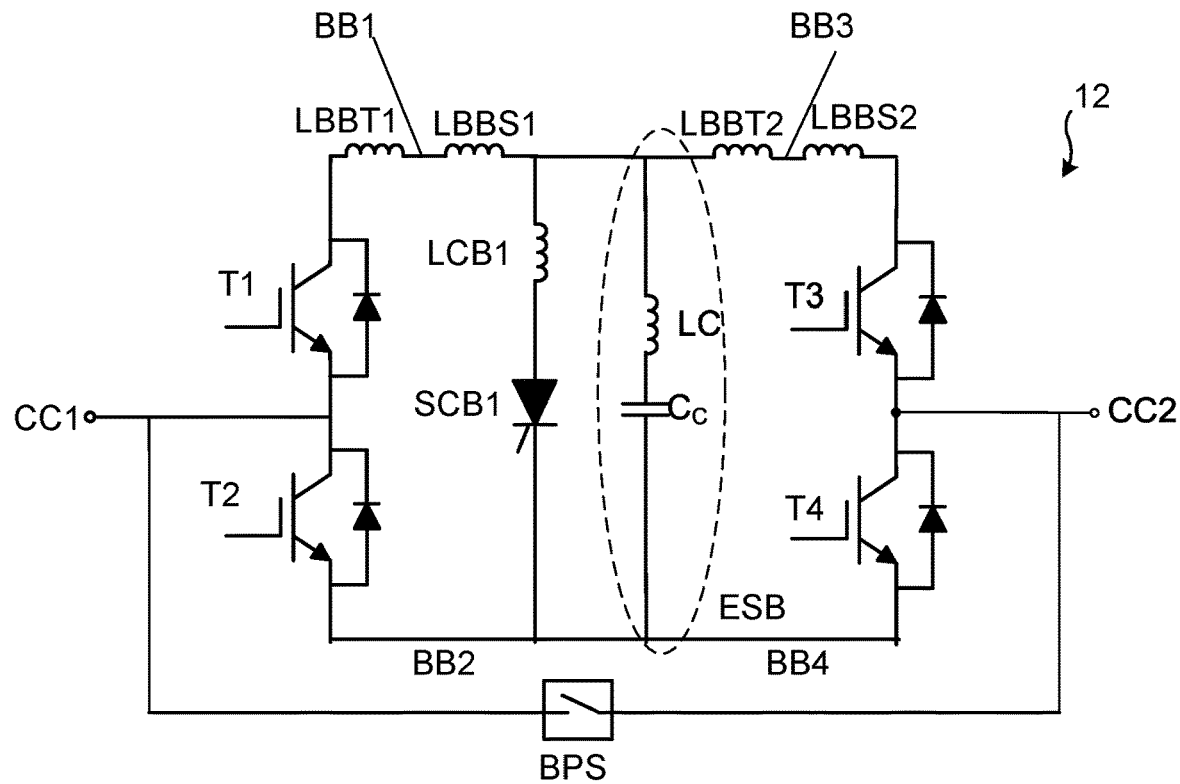
FIG. 12 shows a cell with a full-bridge realization.

FIG. 12 shows a full-bridge cell corresponding to the half-bridge cell in FIG. 2, which cell comprises a second series-connection of switches T3 and T4 in addition to the first series-connection of switches T1 and T2, the energy storage branch ESB and the crowbar branch. A first end of the second series circuit (series connection) of two switches T3 and T4 is connected to the first end of the energy storage branch ESB and a second end of the second series circuit of switches T3 and T4 is connected to the second end the energy storage branch ESB.

In the cell, the midpoint between the switches T1 and T2 of the first series circuit again form a first cell connection terminal CC1. However, in this case the midpoints of the second series circuit of two switches T3 and T4 together form the second cell connection terminal CC2. Again, a bypass switch BPS is connected between the first and second cell connection terminals CC1 and CC2, i.e., in parallel with the cell. In this case there is a second power link between the second series connection of switches T3 and T4 and the energy storage branch ESB, where the second power link comprises a third and fourth busbar BB3 and BB4. In this case the inductance of the first power link comprises the first steady state or static component LBBS1 and the first transient component LBBT1, while the inductance of the second power link comprises a second steady state or static component LBBS2 and a second transient component LBBT2. It should here be realized that alternatively one of the power links may have a traditional realization.

Figure 13:
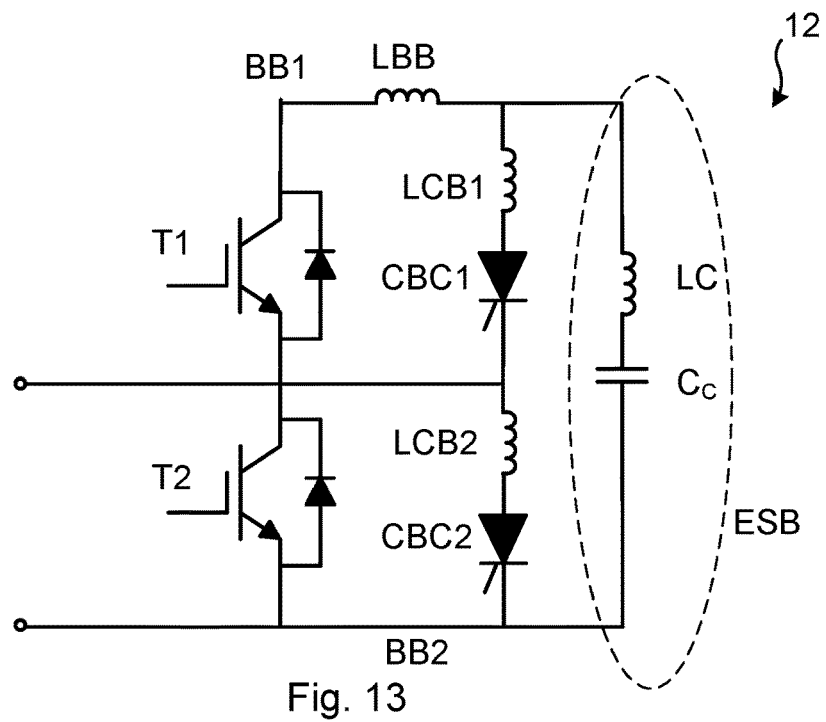
FIG. 13 schematically shows a second variation of the cell with a half-bridge realization.

It is possible that the power link realization with static and transient components can be used in yet other types of cell structures. As can be seen in the half-bridge cell realization in FIG. 13, the power link realization may be used also in a split-DC crowbar protection solution, where the crowbar branch comprises a first and second switching element CBC1 and CBC2 as well as a first and a second impedance LCB1 and LCB2, where a midpoint of the branch is connected to the midpoint of the first series connections of two switches T1, T2 and each branch half comprises a switching element and an impedance. As can be seen it is in this case possible to also omit the bypass switch.

Figure 14:
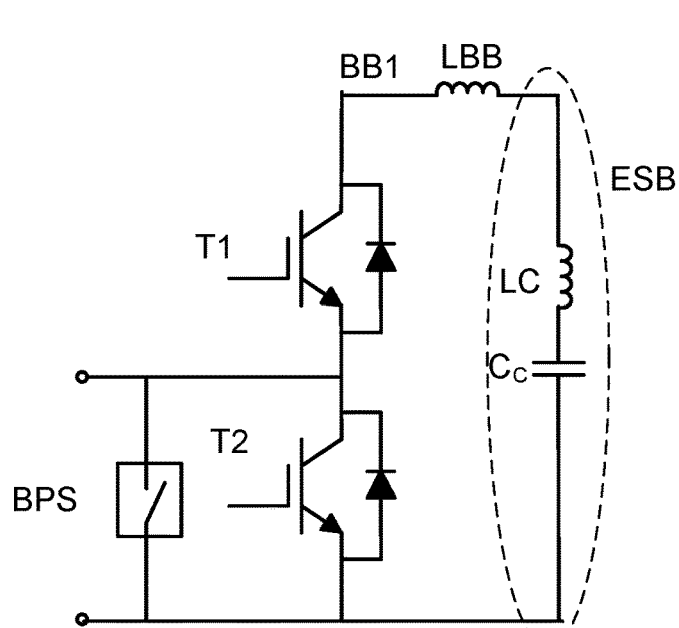
FIG. 14 schematically shows a third variation of the cell with a half-bridge realization.

Another half-bridge cell realization is shown in FIG. 14. In this case there is no crowbar branch but only a bypass branch. It should be realized that in some variations also the bypass branch may be omitted.

The transient inductance introduced by the expanding busbar during cell short-circuit fault reduces the peak current via failed switches and hence prevents explosion of bond-wire modules or reduces the cost/design complexity of presspack modules. This is also done without the use of sensors and actively controlled elements, which simplifies the cell and makes it more robust. The speed with which the transient component of the power link inductance is introduced may thereby also be fast.

The converter may be a power converter as, e.g., used in HVDC power transmission, FACTS systems, or static frequency converter systems.

Figure 15:
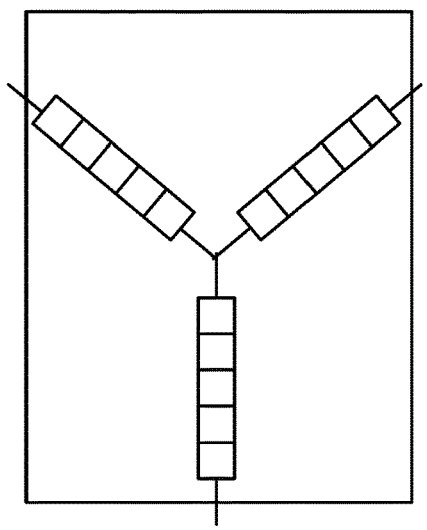
FIG. 15 schematically shows a second variation of a modular multilevel converter comprising cells.
Figure 16:
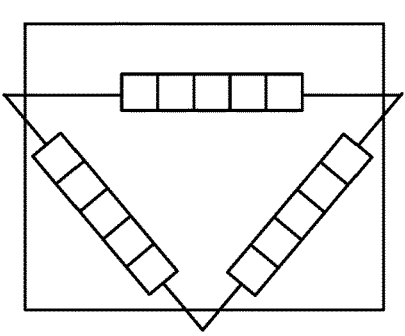
FIG. 16 schematically shows a third variation of a modular multilevel converter comprising cells.

As was mentioned above the MMC converter in FIG. 1 is only one converter type variation. FIG. 15 shows a second variation with wye-connected phase legs and FIG. 16 shows a third variation delta-connected phase legs.

Generally, the present invention discloses the provision of a power link between a series-connection of two switches and an energy storage branch, where the power link has two busbars together providing an inductance with a static component and a transient component being introduced triggered by the occurrence of a short-circuit fault.

Further, features illustrated or described as part of one embodiment can be used on or in conjunction with other embodiments to yield yet a further embodiment. It may be intended that the description includes such modifications and variations.

While the foregoing is directed to embodiments of the disclosure, other and further embodiments of the disclosure may be devised without departing from the basic scope thereof, and the scope thereof is determined by the claims that follow.

The invention claimed is:

1. A cell for a voltage source converter, the cell comprising:
   a first cell connection terminal;
   a second cell connection terminal;
   a first series connection of two switches;
   an energy storage branch comprising a capacitor; and
   a first power link interconnecting the first series connection of two switches with the energy storage branch, the first power link having an inductance that changes based on a current flowing through it;
   wherein the first power link comprises a first busbar interconnecting a first end of the first series connection of two switches with a first end of the energy storage branch and a second busbar interconnecting a second end of the first series connection of two switches with a second end of the energy storage branch; and
   wherein the first busbar is adjacent to the second busbar and at least a part of the first busbar is moveable from the second busbar by repulsion forces.

2. The cell according to claim 1, further comprising a bypass switch connected between the cell connection terminals.

3. The cell according to claim 1, wherein a midpoint of the first series connection of two switches forms the first cell connection terminal and either the first end of the first series connection of two switches or the second end of the first series connection of switches forms the second cell connection terminal.

4. The cell according to claim 1, further comprising:
   a second series connection of two switches; and
   a second power link interconnecting the second series connection of two switches with the energy storage branch, wherein a midpoint of the first series connection of two switches forms the first cell connection terminal and a midpoint of the second series connection of two switches forms the second cell connection terminal.

5. The cell according to claim 4, wherein the second power link has an inductance that changes based on a current flowing through it.

6. The cell according to claim 1, further comprising a crowbar branch connected in parallel with the energy storage branch, the crowbar branch comprising a first switching element configured to be activated to short-circuit the capacitor of the energy storage branch and dissipate energy stored therein based on detection of a short-circuit fault.

7. The cell according to claim 6, the crowbar branch further comprising a second switching element and a midpoint connected to a midpoint of the first series connection of two switches.

8. A modular multilevel converter comprising cells, wherein at least one cell comprises:
   a first cell connection terminal;
   a second cell connection terminal;
   a first series connection of two switches;
   an energy storage branch comprising a capacitor;
   a first power link interconnecting the first series connection of two switches with the energy storage branch; and
   the first power link having an inductance that changes based on a current flowing through it;
   wherein the first power link comprises a first busbar interconnecting a first end of the first series connection of two switches with a first end of the energy storage branch and a second busbar interconnecting a second end of the first series connection of two switches with a second end of the energy storage branch; and
   wherein the first busbar is adjacent to the second busbar and at least a part of the first busbar is moveable from the second busbar.

9. The modular multilevel converter according to claim 8, wherein the first busbar comprises:
   a moveable section having a first end and a second end;
   a first stationary section fixedly attached to the second busbar; and
   a first joint structure configured to move the moveable section away from the second busbar, wherein the first end of the moveable section is joined to the first stationary section via the first joint structure.

10. The modular multilevel converter according to claim 9, wherein, in a steady state operation, the first stationary section is adjacent to and aligned with the moveable section in a longitudinal current transporting direction of the first busbar and the first joint structure comprises at least one fold of superfluous material interconnecting the first stationary section with the moveable section and the first joint structure is configured to be unfolded.

11. The modular multilevel converter according to claim 9, wherein the first busbar further comprises:
   a second stationary section fixedly attached to the second busbar; and a second joint structure configured to move the moveable section away from the second busbar, wherein the second stationary section is joined to the second end of the moveable section via the second joint structure.

12. The modular multilevel converter according to claim 11, wherein at least a part of the second busbar is configured to move away from the first busbar, the second busbar comprises stationary and moveable sections joined to each other in the same way as corresponding stationary and moveable sections of the first busbar, and the stationary and moveable sections of the first and second busbars are aligned with each other along a longitudinal current transporting direction of the first busbar.

13. The modular multilevel converter according to claim 8, wherein the cell further comprises:
 a second series connection of two switches; and
 a second power link interconnecting the second series connection of two switches with the energy storage branch, wherein a midpoint of the first series connection of two switches forms the first cell connection terminal and a midpoint of the second series connection of two switches forms the second cell connection terminal.

14. The modular multilevel converter according to claim 8, wherein the cell further comprises a crowbar branch connected in parallel with the energy storage branch, the crowbar branch comprising a first switching element configured to short-circuit the capacitor of the energy storage branch and dissipate energy stored therein based on detection of a short-circuit fault.

15. A cell for a voltage source converter, the cell comprising:
 a first cell connection terminal;
 a second cell connection terminal;
 a first series connection of two switches;
 an energy storage branch comprising a capacitor; and
 a first power link interconnecting the first series connection of two switches with the energy storage branch, the first power link having an inductance that changes based on a current flowing through it;
 wherein the first power link comprises a first busbar interconnecting a first end of the first series connection of two switches with a first end of the energy storage branch and a second busbar interconnecting a second end of the first series connection of two switches with a second end of the energy storage branch;
 wherein the first busbar is adjacent to the second busbar and at least a part of the first busbar is moveable from the second busbar by repulsion forces;
 wherein the first power link comprises a static component and a transient component; and
 wherein the first power link has the inductance of the static component during steady state operation of the cell and the first power link is configured to introduce the transient component when a short-circuit current flows through the first power link.

16. The cell according to claim 15, wherein the first busbar comprises a moveable section and a first stationary section, the moveable section having a first end joined to the first stationary section via a first joint structure and the first stationary section fixedly attached to the second busbar, and wherein the first joint structure is deformable by the repulsion forces to move the moveable section away from the second busbar.

17. The cell according to claim 16, wherein, in the steady state operation, the first stationary section is adjacent to and aligned with the moveable section in a longitudinal current transporting direction of the first busbar and the first joint structure comprises at least one fold of superfluous material interconnecting the first stationary section with the moveable section and the first joint structure is configured to be unfolded by the repulsion forces caused by the short-circuit current.

18. The cell according to claim 17, wherein the at least one fold comprises a loop of superfluous material.

19. The cell according to claim 18, wherein the first busbar comprises a second stationary section joined to a second end of the moveable section via a second joint structure, wherein the second stationary section is fixedly attached to the second busbar and the second joint structure is deformable by the repulsion forces to move the moveable section away from the second busbar.

20. The cell according to claim 16, wherein at least a part of the second busbar is moveable away from the first busbar by the repulsion forces caused by the short-circuit current and comprises stationary and moveable sections joined to each other in the same way as corresponding stationary and moveable sections of the first busbar, where the stationary and moveable sections of both busbars are aligned with each other along a longitudinal current transporting direction of the first busbar.

* * * * *